United States Patent
Chang et al.

(10) Patent No.: US 8,312,217 B2
(45) Date of Patent: Nov. 13, 2012

(54) METHODS AND SYSTEMS FOR STORING DATA BLOCKS OF MULTI-STREAMS AND MULTI-USER APPLICATIONS

(75) Inventors: Yee-Hsiang Sean Chang, Cupertino, CA (US); Yiqiang Ding, Sunnyvale, CA (US); Bo Leng, Shanghai (CN)

(73) Assignee: Rasilient Systems, Inc., Sunnyvale, CA (US)

(*) Notice: Subject to any disclaimer, the term of this patent is extended or adjusted under 35 U.S.C. 154(b) by 225 days.

(21) Appl. No.: 12/650,540

(22) Filed: Dec. 30, 2009

(65) Prior Publication Data

US 2010/0205369 A1    Aug. 12, 2010

Related U.S. Application Data

(60) Provisional application No. 61/141,648, filed on Dec. 30, 2008.

(51) Int. Cl.
*G06F 13/00*    (2006.01)
*G06F 13/28*    (2006.01)
*G06F 3/00*    (2006.01)
*G06F 5/00*    (2006.01)

(52) U.S. Cl. ........ 711/118; 711/112; 711/136; 711/138; 711/E12.017; 710/52

(58) Field of Classification Search .................. 711/118, 711/112, 136, 138, E12.017; 710/52
See application file for complete search history.

(56) References Cited

U.S. PATENT DOCUMENTS

| 6,347,358 | B1* | 2/2002 | Kuwata | 711/113 |
| 2004/0024971 | A1* | 2/2004 | Bogin et al. | 711/135 |
| 2009/0077312 | A1* | 3/2009 | Miura | 711/113 |

* cited by examiner

*Primary Examiner* — Edward Dudek, Jr.
(74) *Attorney, Agent, or Firm* — Venture Pacific Law, PC

(57) ABSTRACT

A method for storing data, comprises the steps of: defining one or more intervals for one or more virtual disks, wherein each of the intervals has data; receiving a storage command in a cache, wherein the command having a logical address and a data block; determining a respective interval for the data block corresponding to the logical address of the data block; determining whether the data of the respective interval is to be written to a corresponding storage unit; and receiving a next storage command.

6 Claims, 12 Drawing Sheets

Virtual Disk    Chunk Table    Physical Disk

| iSCSI | RST | RC | RV | LVM | MD | xSCSI |
|---|---|---|---|---|---|---|

Fig. 2

| 3 | 5 | 2 | 1 | 7 | 6 | 4 | 8 | 9 | 0 |

Fig. 5

| 3 | 5 | 2 | 1 | 7 | | 4 | 8 | 9 | 0 | 6 | |

Logical chunk 6 (Physical chunk 5 is reclaimed)

Fig. 7

| 3 | 5 | 2 | 1 | | | 4 | 8 | 9 | 0 | 6 | 7 |

Logical chunk 7 (Physical chunk 4 is reclaimed)

Fig. 8

| | | | |
|---|---|---|---|
| | 2 | 2 | 2 |
| 6 | 6 | 6 | 6 |
| 0 | 0 | 0 | 0 |
| 9 | 9 | 9 | 9 |
| 8 | 8 | | 1 |
| 4 | 4 | 4 | 4 |
| 7 | 7 | 5 | 5 |
| 3 | 3 | 3 | 3 |
| 1 | | 7 | 7 |
| 2 | | 8 | 8 |
| 5 | 5 | 5 | |
| | 1 | 1 | 1 |
| Logical chunk 3 &7 | Logical chunk 2 & 1 | Logical chunk 8 &7 | Logical chunk 5 & 1 |

Fig. 9

A. One Level Hash Tables

Free List with Two Level Hash Tables

METHODS AND SYSTEMS FOR STORING DATA BLOCKS OF MULTI-STREAMS AND MULTI-USER APPLICATIONS

CROSS REFERENCE

This application claims priority from a provisional patent application entitled "Methods and Systems to Guarantee the Quality of Service for Multi-Stream, Multi-User Write Applications" filed on Dec. 30, 2008 and having an Application No. 61/141,648. Said application is incorporated herein by reference.

FIELD OF INVENTION

This invention relates to methods and systems for storing data in a storage unit and, in particular, to methods and systems for storing data of multi-stream and/or multi-user applications.

BACKGROUND

A storage system, either direct-attached or storage area networked ("SAN") based, provides a block interface to a host. The block interface uses volume abstraction, where each volume represents a linear storage space in sectors. As technology advances, the size of each volume grows. The modern storage system volume is easily in multiple terabytes ("TB").

Generally, a file system or application breaks the linear storage space into blocks and arranges the storage space. To improve the performance, the application writes multiple concurrent files at the same time, where each file can be placed at distinct locations on the storage space.

For instance, in a video surveillance application that supports many video camera streams, each camera stream can be written to one or more files. With additional cameras, multiple files can be written at the same time. This can be an example of a multi-stream application.

Another example of a multi-user application is a cloud storage application that uses the Internet to provide for on-line storage of user data. Many users can store their data or files at the same time, thus simultaneously writing files to a storage system, where all incoming data or files can be placed in distinct locations in the storage system.

The storage performance for multi-stream and/or multi-user applications is problematic due to performance limits of electromagnetic hard disk drives ("HDDs") of the storage system. Although modern electromagnetic drives have outstanding sequential speed, over 100 MBps per drive and can linearly scale with drives, these electromagnetic drives suffer from random read/write performance limits, including slow seek time, rotational latency, speed variations between outer tracks and inner tracks, and other limits.

With respect to seek times, for SATA drives, the seek time is typically 10 ms; even with enterprise SAS drives, the seek time is around 5 ms. Additionally, for every disk seek, there is a disk rotational latency until the target sector reaches the disk head. For SATA drives with 7200 RPM, the average rotational latency is 4.16 ms.

Furthermore, storage quality of service ("QoS") schemes can incur additional performance cost when dealing with the multi-stream and/or multi-user applications. For instance, RAID5 can incur a huge performance cost since a single write generates two additional reads and one additional write. This can happen with random traffic since RAID5 requires reading data and the parity for the data before writing the new data and the new parity. Consequently, read/write operations of data blocks are especially slow for multi-stream and/or multi-user applications and in particular for RAID.

This problem can be addressed by using many disks for parallel access or using high performance drives, such as SAS/FC drives and solid states drives ("SSD"). However, these are expensive solutions, and thus cost prohibitive.

Therefore, it is desirable to provide methods and systems for efficiently storing data blocks that allow for the use of existing low-cost, high-capacity SATA drives without the need to use many high-end drives (e.g., SAS/FC drives, SSD, and so forth).

Furthermore, it is desirable to provide methods and systems for reducing the performance variation of random read/write operations in storage systems due to mechanical latency in electromagnetic disk drives or RAID technologies.

Additionally, many multi-stream and multi-user applications send data blocks consistently to the storage unit. However, due to file system allocation and lack of communication with the storage unit, the data blocks from each stream may be written to the storage unit (otherwise referred to as "flushing" data to the storage unit), leading to overall reduced performance in the system. For instance, in video surveillance applications, each video stream can have different frame rates and/or video resolutions. Some streams are initiated by motion activated detection, while some streams are not. Without the knowledge of how fast the data is coming and when, the cache may not be flushed when the data block is full. Thus, instead of a few large blocks written to the storage stack, many small blocks are also sent down. Thus, as a result, the data blocks written to the storage unit are written to random locations on the storage unit, which requires the storage system to use more resources to process the data blocks.

Furthermore, for applications such as network surveillance recording ("NVR") applications, which involve continuous writes, contiguous dirty buffers can accumulate over time. The accumulating area of memory can be called a "growing spot" since data is continually written to the memory. Depending on the bandwidth for each data stream from the NVR application, the accumulating speed for each growing spot can be different, which can require frequent writes from cache to the storage unit. Frequent flushing of growing spots can severely degrade overall performance. The degradation can be compounded even more when a number of growing spots occur, which is typically true for hundreds of NVR streams.

Generally with NVR applications, meta-data is created along with video data. Typically, meta-data has relatively smaller block size compared to video data and is randomly written to a virtual drive; whereas video data is much larger in block size and is written sequentially to the virtual drive. In order to update the meta-data, frequent writes to the storage unit are generated in a small area of the virtual drive, which causes cache hits (i.e., hitting the same area multiple times). These areas can be called "hot spots". Frequent flushing of the hot spots can also severely degrade performance since write commands are required, which incur multiple seek times due to the randomness in writing the meta-data to the storage unit.

Current caching systems do not treat meta-data differently from video data, thus incurring enormous performance cost. Therefore it is desirable to provide methods and systems for storing data according to the type of data to be written to storage.

SUMMARY OF INVENTION

An object of this invention is to provide methods for converting a random read/write pattern in storage systems to a sequential read/write pattern.

Another object of this invention is to provide storage systems that can guarantee the quality of service for multi-stream and/or multi-user write applications.

Yet another object of this invention is to provide sequential storage systems that can be several orders of magnitude improved over random read/write performance, and deterministic.

Furthermore, another object of this invention is to provide methods for reading/writing data from/to a storage unit that can reduce random write/read commands and improve efficiency through implementing data aggregation policies.

Briefly, a method for storing data, comprises the steps of: defining one or more intervals for one or more virtual disks, wherein each of the intervals has data; receiving a storage command in a cache, wherein the command having a logical address and a data block; determining a respective interval for the data block corresponding to the logical address of the data block; determining whether the data of the respective interval is to be written to a corresponding storage unit; and receiving a next storage command.

An advantage of this invention is that methods are provided for converting a random read/write pattern in storage systems to a sequential read/write pattern.

Another advantage of this invention is that storage systems are provided that can guarantee the quality of service for multi-stream and/or multi-user write applications.

Yet another advantage of this invention is that sequential storage systems are provided that can be several orders of magnitude improved over random read/write performance, and, most importantly, deterministic.

Furthermore, another advantage of this invention is that methods are provided for reading/writing data from/to a storage unit that can reduce random write/read commands and improve efficiency through implementing data aggregation policies.

DESCRIPTION OF THE DRAWINGS

The foregoing and other objects, aspects, and advantages of the invention will be better understood from the following detailed description of the preferred embodiment of the invention when taken in conjunction with the accompanying drawings in which:

FIG. 2 illustrates a storage stack structure of the present invention.

FIGS. 5-9 illustrate various chunk tables of the present invention.

DETAILED DESCRIPTION OF THE PREFERRED EMBODIMENTS

Since applications and file systems do not control block usage, it can be assumed that the applications and file systems would have random access to the blocks. The present invention provides for a scheme where virtual addresses (also referred to as logical address) are mapped to physical addresses such that data blocks are written sequentially in a storage unit. A mapping table can be used for the mapping of the virtual address space used by the applications and file systems to the physical address space of the storage unit, such that data located at the virtual addresses are read/written to the storage unit at corresponding physical addresses of the storage unit.

Note that the virtual addresses can include virtual volume number, virtual block number, and other addressing schemes. Also, the storage unit may comprise one or more physical hard disk drives and possibly other drives (e.g., solid state drives).

Figure 1:
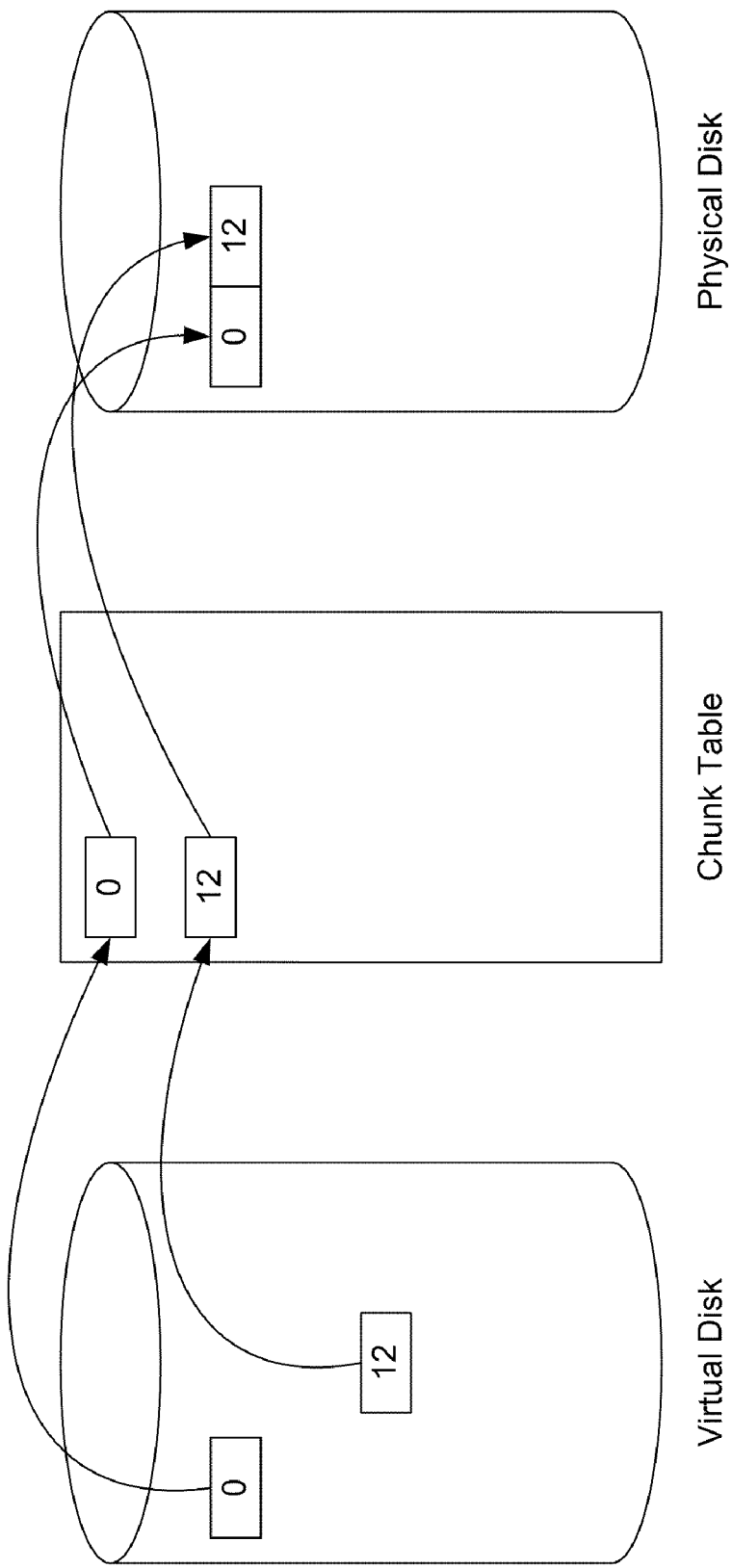
FIG. 1 illustrates a sequential mapping of data from a virtual drive to a storage unit using a chunk table.

FIG. 1 illustrates a sequential mapping of data from a virtual drive to a storage unit using a chunk table. A SCSI command request can be received with a data block at a virtual address for that block of data, where the virtual address may be randomly located in the virtual space. The random placement of the data block in the virtual space can be sequentially ordered for reading/writing to the storage unit to improve read/write performance. Since the data is temporarily stored in the cache, the virtual address can be mapped to a physical address, regardless of the virtual location of the virtual addresses. Another SCSI command can be received having its own data block at a virtual address such that the data block is sequentially written to the storage unit at the next available physical address.

A chunk table (or otherwise can be referred to as a block mapping table) can be defined to map the virtual address for the data block with a physical address. When the chunk table is accessed by a virtual address, the content of the chunk table for that virtual address is a corresponding physical address. Since the chunk table is necessary to retrieve the physical addresses of data blocks, the chunk table can be saved in the storage unit, another controller, and/or the cache of the storage system. The cache can be volatile memory, thus an additional power supply (e.g., battery pack) can be implemented to power the volatile memory if the main power supply fails.

The virtual address mapping to the physical address can be done dynamically such that the actual physical blocks can be allocated at the moment the system mixes various storage commands from various data streams or applications. Thus, it does not matter how the virtual addresses are assigned by the applications, how far apart the data blocks are in the virtual space, or how the various data streams were previously mixed.

When the data block is to be written to the storage unit, the virtual addresses can be mapped to a physical address on the storage unit. During the mapping process, all data blocks, even with far-apart virtual addresses from different files or streams, are written in sequential fashion to the storage unit thus increasing the write performance for the storage unit. Also, the sequential write performance difference between inner and outer tracks can be compensated during this process.

The storage unit may comprise one or more different types of drives, including magnetic hard disk drives and one or more SSD drives. Therefore, since SSD drives do not suffer from random access performance degradation, sequential storage schemes of the present invention can be applied for the one or more magnetic HDDs and be deactivated for the SSD drives. Or, SSD drives may be used as the initial storage area where the data is rewrote to the magnetic HDDs in a performance efficient manner.

One of the challenges for dynamic sequential block allocation for multi-stream/multi-user is to reuse deleted or empty spaces. Blocks that are placed next to each other on the storage unit may not be deleted at the same time. This can create holes in the volume, which causes sequential placement of data blocks on the storage unit difficult to maintain on subsequent read/write commands when the overall space of the storage unit has been used.

Furthermore, the block storage system does not have file information about which files are deleted. The block storage system only knows of the block deletion when the same block addresses reappear in subsequent storage commands.

In an embodiment of the present invention, a rotational volume can be generated by a host to which the parameters of the rotational volume can be specified by a user. Rotational volumes provide multiple virtual drives that will be used in a rotational fashion, which can communicate to the host about the cleanup process to improve performance. Once the hosts start to access a new or next drive, the previous drives are allowed to be reused by writing over the contents of the previous virtual drives with the new or the next virtual drive. For instance, assuming a single hard disk drive is provided as the storage and two virtual drives are used, an "e" virtual drive and an "f" virtual drive. When the e virtual drive is filled with data, then the application will try to write to the f virtual drive by sending a storage command, which will indicate to the storage system of the present invention to write over the e virtual drive since both virtual drives are implemented by a single hard disk drive.

In another embodiment of the invention, a cleanup space can be reserved in a storage unit. The cleanup space can be 10%, 20%, or more of the storage unit. The sequential pattern can use this space after the original volume is full. This allows for the possibility that additional spaces will be freed from the storage unit such that on subsequent writes to the storage unit, more holes can be provided for a more sequential write. Thus, the storage system can check for the reuse of the address space and clean up the storage unit more efficiently.

In a preferred embodiment of the present invention, for multi-stream applications that share the same file system on the same volume, generally, the RAID or Disk Group is required to be used by the same volume. A volume can be configured as a rotational volume having a cleanup space of 20%.

Additionally, for multi-user apps that use different volumes for different users, the RAID or Disk Group is required to be used by all the users. Each volume can be configured with a cleanup space of 20%. Since there are more volumes in this case and the RAID is shared, the aggregate cleanup space can help the overall cleanup.

Generally, a virtual disk is addressed in terms of a sector, which has a size of 512 bytes. Thus, the virtual disk ("VD") can be referenced by sector number, e.g., sector 1, sector 2, sector 3, and so forth. In another aspect of the present invention, with an addressing scheme of the present invention, the virtual disk can be divided into multiple virtual disk address intervals (where each interval can be referred to as "VAN"). Each VAN can be a block of 64 kB, 128 kB, 1 MB, or other sizes, which is larger than a sector of 512 bytes. The storage capacity for each VAN can be dependent on the storage layer to which the VAN is applied.

When storage commands (e.g., SCSI commands) are received, then the associated data blocks are stored in the respective VAN until the respective VAN is full. When the VAN is full, the data blocks in the VAN are written to the storage unit. Thus, the number of write commands to the storage unit is reduced and the performance of the storage system is increased since large blocks of data are written to storage unit at a time, instead of writing many small blocks of data. For instance at hot spots of the memory, a VAN is not flushed until the VAN is filled. Thus, even though there may be multiple cache hits in one VAN, those cache hits are not written to the storage unit until the VAN is full.

VANs can be used to communicate between the host and the storage system as to when to write data from the cache to the storage unit. A VAN can represent the commitment from the storage that a resource is reserved for the host. It also indicates to the host to take advantage of the reserved resources and to fill it up before writing the data block managed by the VAN to the storage unit. This aggregation policy ensures the fullness of the VANs to reduce random read/write to the storage unit and improve the overall read/write performance.

One or more criteria can be used to determine whether to flush a VAN. One criterion can be whether the VAN is full. For instance, if video data is being stored in a VAN, the data can be sequentially stored in sector N to sector N+10 of a virtual disk. Thus, if the VAN is full, then the VAN can be flushed. In addition, if a predefined number of sequential sectors are stored on a VAN, the VAN can request to reserve a maximum number of buffers to store data for the VAN.

Another criterion for flushing a VAN is whether the total number of VANs are currently activated such that new VANs cannot be created. For instance, if memory can only support up to 1000 VANs, where each VAN manages 64 kB of data. In an extreme case, random traffic can access the first sector for each VAN. Thus, a total of 1000 sectors can be accessed in the worst case for the 1000 storage commands. When the 1001 request is received, no VANs are available to store the new request. Therefore, one or more of the activated VANs need to be flushed to free up resources to accept the next storage command. The resources are limited by the amount of memory in the cache to support the buffers of the VANs.

In another embodiment, the VAN can allocate the buffers on a need basis to save on memory resources. Thus, although the VAN has the potential of managing a predetermined data size (e.g., 64 kB of data), the VAN can dynamically assign buffers for implementing the predetermined data size.

In yet another embodiment of the present invention, a VAN can be a data structure, which can store data and have attributes to keep track of the statistics and the history of the VAN. For instance, a VAN can have the following attributes: a size of the VAN; a device number of the VD; a logical block address ("LBA"), an address offset in the units of interval; a time stamp of when the VAN was generated; a number of dirty pages in the VAN; a time stamp of when the VAN was accessed; a number of times the VAN has been read; a metric corresponding to the growth of the VAN; a number of times of a cache hits; a pointer to a sorted array of the individual buffers, which store the data managed by the VAN; and a number of associated persistent buffer heads ("PBHs"), where the PBHs is a list of pointers to one or more associated buffers; and other attributes. The attribute fields can be added or deleted as needed depending on the optimization scheme and user requirements. Furthermore, the attributes can be updated as needed to reflect the current use of the VAN.

With respect to the attributes, the size of the VAN can be 64 kB, 128 kB, 1 MB, or other sizes. Typically, buffers are of 4 kB. Thus, in order to store 64 kB worth of data each VAN must be implemented by a number of buffers to support the VAN size. For instance, 16 buffers (each having 4 kB) are needed to implement a VAN having a size of 64 kB.

The device number can be used to identify a virtual disk to which the VAN is assigned. For instance, if there are 256 virtual disks, the device number can range from 0 to 256 to identify a particular virtual disk. Also, if there is only a single virtual disk, then this attribute may not be used or altogether removed from the data structure.

The LBA is specific to the VD. Each VD has a block size from 0 to a maximum number to span the VD. Thus the LBA addresses to the sector in the VD.

With respect to a time stamp, a VAN is not given a time stamp until it is given a data block to manage. When there is a storage command from an upper layer, then the VAN is allocated to manage the data block and the time stamp is given at that time. Other time stamps can be recorded for the VAN, such as when the VAN is accessed and when the VAN is read.

In addition, the VAN may store the number of dirty pages, where dirty pages are the write to storage buffers that have data, which has not been written to the storage unit.

Other statistical values can be stored relating to the VAN, e.g., a number of times the VAN has been read, a metric corresponding to the growth of the VAN, a number of times of a cache hit for the VAN, and so forth. For instance, the metric can correspond to the number of sectors that are sequentially stored on the VAN. Additionally, the metric can correspond to the number of consecutive storage command requests for the VAN.

The pointer to the ordered array is to retrieve the data buffers that store the data to be written to the storage unit. A Judy sorted array can be used for an ordered array. Alternatively, a list of pointers to the data buffers can be directly saved in the VAN, however this can incur significant performance costs, thus a sorted array with pointers to the buffers is preferable. The ordered array can be used in a two step process: first step is to access the ordered array; and second step is to use the contents in the ordered array to access the data buffers. Additionally, a number of associated PBHs is the number of buffers being used by the VAN.

In terms of management of the VANs, a free list can be generated which contain a list of VANs that are available to be used and receive storage commands. A busy list can also be generated containing a list of VANs that are currently being used and have stored data, e.g., a data block, a device number, a LBA, a timestamp, and so forth stored on the VAN. Preferably, the free list and the busy list are implemented by doubled-linked lists.

A global VAN array can be used to store pointers to all the VANs. The global VAN array can be implemented by a hash table, a Judy ordered array, or other sorted array of data to reference the VANs.

Furthermore, a flushing array can be defined to store the VANs, which are ready to be written to the storage unit.

In terms of generating VANs, a VAN can be generated based on the traffic for accessing a virtual disk. For instance, when a storage command requests to access a logical address of a virtual disk, e.g., sector 0, the global VAN array is searched for a VAN that handles sector 0 of the virtual disk. If a VAN does not exist in the global VAN array, the attributes and other information for the VAN are defined to generate a corresponding VAN. Once defined, the VAN is added to the global VAN array.

When the data of the VAN is written to the storage unit, then the VAN can be deleted to be reused for incoming storage requests. When a buffer needs to be reused, the VAN associated with the buffer needs to be decreased such that when a buffer is deleted (i.e., for reuse), then the number for the associated PBH to its VAN decreases by 1. Furthermore, if the number of associated PBHs is 0, the VAN is moved to free VAN list since it is not being used to manage data.

Furthermore, historical data can be stored for the VANs, such as the number of total VANs created, the number of VANs that have ever been reserved with buffers, VANs that have been released with reserved buffers, VANs that have been flushed, partially filled VANs flushed, average number of buffers in partially filled VANs flushed, and full VANs flushed.

The historical data can be used to adjust the criteria for flushing to further optimize the performance of the storage system. For instance, if buffers are reserved for a buffer, then the number of released buffers with reserved buffers can give an indication of the accuracy of our parameters for reserving buffers.

In another embodiment of the invention, if a VAN is determined to be a VAN for video data, then the buffers for the VAN can be reserved and locked so that other VANs can be used since this VAN has more probability of filling up the VAN.

In an example of video data traffic for a growing spot, a first storage command request is received for sector 0-7, then a VAN 0 is allocated for this sector and the attributes are assigned accordingly. A second storage command request is received for sector 8-15. The Global array is checked to see if corresponding exists. Since VAN 0 exists, the second storage command is stored in VAN 0. In order to save the data block for the second storage command, a buffer is allocated to VAN 0. For a third storage command for section 16-18, another buffer is allocated in the buffer and saved in VAN 0.

Due to having consecutive sectors referenced in the storage commands, the VAN 0 may reserve buffers since there's a good probability of the VAN filling. Thus, when the rest of the storage commands are received for the next sectors, those data blocks are stored in the reserved buffers. Once all the sectors 0 to 127 have been stored, the VAN is filled, meaning the 16 buffers are filled with data blocks. The data blocks of the VAN can now be flushed to the storage unit.

In another example of meta-data traffic for hot spots/cache hits, a first storage command for a VAN is received for sectors 0-9. With multiple consecutive storage commands for the same page, then it can be apparent that the VAN will probably not be filled. The same page can mean overlap between sectors for a VD. For instance, a first storage command for sectors 0-7, a second storage command for sectors 4-9, and a third storage command for sectors 3-4 can be considered hitting the same page since the sectors overlap. Thus, if the VAN is flushed, it may be a waste of resources since new data is constantly being written to the VAN. Therefore, the data blocks in the VAN are held longer before being flushed to storage unit.

Multi-Stream Video Surveillance Example

For applications like video surveillance, the write from each stream is sequential. Then it becomes random when multi-stream writes happening at the same time. The storage system performs much faster with sequential write than the random write to the storage unit.

A redirect-on-write ("ROW") technology can be used to put far apart data blocks in the virtual space into sequential physical locations in the storage unit.

Specifically, a VD space can be divided into many chunks, where each chunk has the same size. A chunk can be filled quickly with data blocks because of the sequential pattern in each write stream to the storage unit. Then the ROW places logically far apart chunks in the virtual space into sequential physical locations. A chunk table can be used to record the mapping from logical chunk addresses (which can be referred to as a logical address or virtual address) to physical chunk addresses (which can be referred to as physical addresses). A logical address is used to write data from users, and physical chunks are used to flush data to disks.

Physical chunks can be allocated dynamically. After a VD is created, every physical chunk is free and can be placed into a free chunks list (which can be referred to as a free list). The physical chunks can then be removed from the list and marked as used as data is received.

The ROW might hurt the sequential read performance because logically sequential data in a stream are in scattered physical locations. However, for video surveillance, this may be acceptable since most of storage commands are writes. There are other methods that can be used to adjust the read performance in conjunction with this embodiment of the present invention.

Generally, one of the biggest issues for video surveillance is data fragmentation. The fragmentation can come from file systems or from ROW. For instance, data stored consecutively in the storage unit may be deleted at different times, and stored again at different times.

This creates holes or fragments in the original consecutive environment of the storage unit after a number of storage commands. To address that, a storage system of the present invention can employ a ROW after a creation of a VD. Or, alternatively, the data can be stored without ROW and let the storage system decide when and what types of data to be stored with ROW. This is similar to taking snapshots, except the snapshots are triggered by data backup and/or protection operations. For video surveillance, a ROW can be triggered once fragmentation is discovered or data that is random and far apart are detected.

Figure 2:
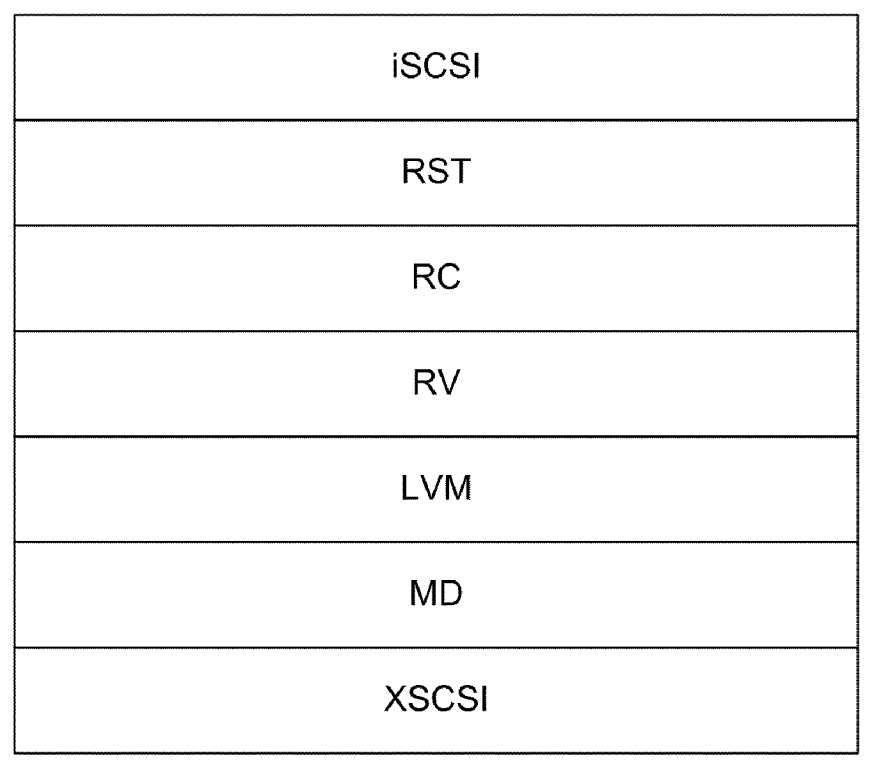

In order to implement a ROW, we need to use a reference table to map a logical address to a physical address. This table can be referred to as a chunk table. This address mapping function is implemented as a new layer on top of a current LVM ("logical volume manager") layer. The new module can be referred to as "RV". The virtualization refers to new logical address mapping table. FIG. 2 illustrates a storage stack structure of the present invention.

The RV module is implemented as a Linux block device driver, where its major number is 245. All the data for the RV is created as a block device. The relationship between a RV device and a LVM device is described as follows. Data for a VD (without ROW) matches to an original data for a RV device (without ROW). A sequentially aligned VD matches to an individual RV device (with ROW). The underlying LVM device provides capacity to be shared by all RVs (with or without ROW). That is, a data of an RV device and all of its RV devices reside in the same LVM device. The capacity of the underlying LVM device can be sliced into units called "chunks". A chunk table of the data for a VD and sequentially aligned VDs will help to indicate the exact location.

After introducing the new RV layer, the functionality of the LVM layer is focused on managing physical volumes. The functionality of the RV layer is focused on managing sophisticated address mapping scheme due to ROW. In the storage stack, the LVM device provides a single physical block device with the exact space for data of the VD and the sequentially aligned VD.

In order to carry out the address mapping, a chunk table and a search table can be created. This can be the metadata of a RV device.

Thus, to manage the physical volume, the capacity of a RV device is sliced into data units called "chunks". The size of the RV device is an integral of multiple chunks. In an RV module, the chunk size is defined in a macro CHUNK_SIZE, which has a default value of 16 MB.

The chunk table is used to indicate the ownership of each physical chunk in the physical LVM device. The chunk table can be considered as an array with N entries. Each entry is mapped to a chunk on the LVM device. N is equal to the number of physical chunks in the LVM device. The index of the chunk table is the physical chunk number, i.e., the index of this table is in the range of [0, N−1].

The following is an example of the physical chunk entry definition ("rv.h") in a general purpose programming language:

```
typedef struct phychunk_usage_s pc_usage_t;
    struct phychunk_usage_s {
        gen_t gen;              // generation of chunk
        chunk_t lc;             // logical chunk number
        chunk_t pc;             // physical chunk number
        unsigned long flags;
        pc_usage_t *next;
        uint64_t bitmap[4];
    };
```

The Search table is used to search chunks based on logical address and generation. The search table has M entries, where M equals to the number of logical chunks in the original RV. The index of the search table is the logical chunk number, that is, the index of this table is in the range of [0, M−1]. Each entry in the search table is a linked list header. Each linked list links all the physical chunk numbers that have the same logical address. The chunk table is a link list and is sorted by their generation. The generation is used to refer to the number of snapshots or the number of sequentially aligned RV devices generated. Because sorted by generation, the physical chunks belonging to the data RV are always put at the beginning of the link list. Thus, the search time of the data RV is the fastest. In this way, the performance of the data RV will not be impacted by the address-mapping scheme.

The chunk table can have the following columns: physical chunk ("pc"), logical chunk ("lc"), generation, and bitmap. The bitmap field in pc_usage_t is based on the consideration of memory efficiency. Each bit in the bitmap is indicated by a block in the chunk. A block is the basic unit for the ROW operation. The block size is 64 k which is defined in macro RV_BLOCK_SIZE, thus 16M/64 k=256 bits=32 bytes for the bitmap is needed.

Figure 3:
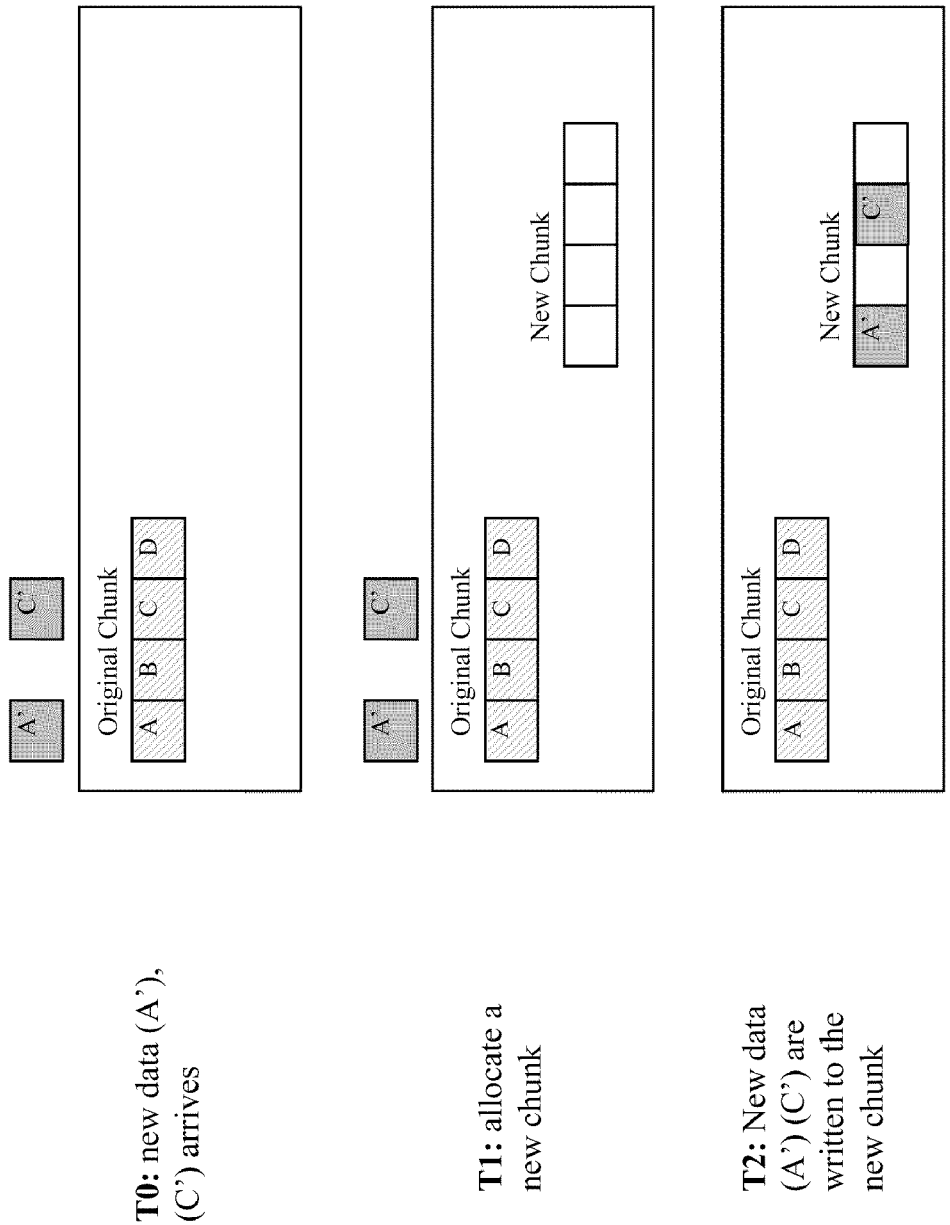
FIG. 3 illustrates a scheme of the present invention for writing to a new chunk.

The block is the basic 10 unit for ROW. When doing ROW, a new chunk space is allocated on the storage unit, but some of the blocks may be written to the new chunk. FIG. 3 illustrates a scheme for writing to the new chunk.

In illustrating the chunk table, in an example can be used, where there are only four blocks in a chunk (which means the bitmap contain only 4 bits).

Furthermore, assume that a user creates RV1 with size of 3 chunks, and also reserves 2 extra chunks for the sequentially aligned RV. Therefore, we have 5 chunks in total for user data in the LVM device. The first 3 chunks are allocated to RV1 and their bitmap are initialized to 1111. The last 2 chunks are free as shown below.

The chunk table can be written as,

| Physical | Logical | Generation | bitmap |
|----------|---------|------------|--------|
| 0 | 0 | MAX | 1111 |
| 1 | 1 | MAX | 1111 |
| 2 | 2 | MAX | 1111 |
| 3 |   | 0 |   |
| 4 |   | 0 |   |

The search table can be written as,

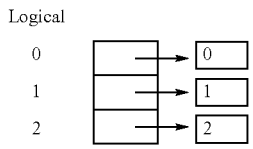

After sequentially aligned RV (SNAP 1) is triggered, all the write requests will cause ROW. Assume logical chunk 0, block 0 needs to be written on RV1. Based on the search table, logical chunk 0 is mapped to physical chunk 0. The next free physical chunk is 3, and the entry pcu(3) is updated. Moreover, pcu(3) is inserted into the beginning of the search list 0. The previously mapped chunk 0 also needs to be updated, changing its generation to 1. This indicates that now physical chunk 0 is not shared by RV1 any longer, but just owned by SNAP 1. pcu(3).bitmap[0] is set to 1 and the other bits are set to 0. The following tables illustrate the updated chunk table and the search table, respectively.

| Physical | Logical | Generation | bitmap |
|---|---|---|---|
| 0 | 0 | 1 | 1111 |
| 1 | 1 | MAX | 1111 |
| 2 | 2 | MAX | 1111 |
| 3 | 0 | MAX | 1000 |
| 4 |   | 0 |   |

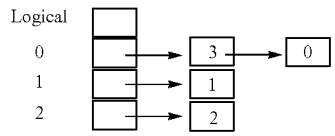

If logical chunk 0, block 2 needs to be written on RV1, since physical chunk 3 has been allocated to RV1's logical chunk 0, the request to physical chunk 3, block 2 is sent and pcu(3).bitmap[2] is set to 1. Then the chunk table and search table become:

| Physical | Logical | Generation | bitmap |
|---|---|---|---|
| 0 | 0 | 1 | 1111 |
| 1 | 1 | MAX | 1111 |
| 2 | 2 | MAX | 1111 |
| 3 | 0 | MAX | 1010 |
| 4 |   | 0 |   |

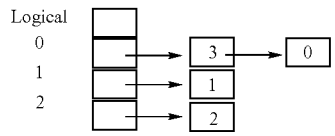

In more complicated situations the following can occur. Following the previous example, assume that a user creates another sequentially aligned RV SNAP 2. The generation of SNAP 2 is 2. The chunk table and the search table are not altered. Assume that now there is a WRITE request for chunk 0 of RV1 again, e.g., block 1. ROW will be performed. The free chunk 4 will be used for ROW, and the new node 4 will be inserted again at the head of search list 0. The generation of physical chunk 3 is updated to show that it is now only owned by SNAP 2. The following tables are updated after ROW happened.

| Physical | Logical | Generation | bitmap |
|---|---|---|---|
| 0 | 0 | 1 | 1111 |
| 1 | 1 | MAX | 1111 |
| 2 | 2 | MAX | 1111 |
| 3 | 0 | 2 | 1010 |
| 4 | 0 | MAX | 0100 |

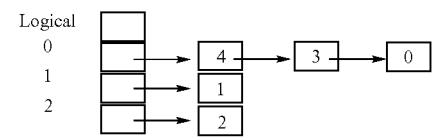

With respect a read command, finding the right chunk and right block is the core operation in READ. Although, the right physical chunk belongs to the VD or sequentially aligned RV was found, the data block may still be in an older chunk.

If a particular area needs to be read, e.g., chunk 0 of RV1, block 1, then it is known that the physical chunk 0 for original RV is at the head of search list 0. Then it is possible to find that the physical chunk 4 and CT(4).bitmap[1] is exactly 1, so the read request is mapped to physical chunk 4, block 1.

If a particular area needs to be read, e.g., chunk 0 of RV 1, but block 3. The pcu(4) can be found, but pcu(4).bitmap[3] is 0. So the search list 0 is searched, and the following can be found that pcu(3). pcu(3).bitmap[3] is also 0. Then pcu(0).bitmap[3] is found to be 1. Therefore, the read request is mapped to physical chunk 0, block 3.

If a particular area needs to be read, e.g., chunk 0 of SNAP 2, block 0. In the search list 0, physical chunk 3 is found and has the generation 2 and pcu(3).bitmap[0] is 1. Then, the read request is mapped to the physical chunk 3, block 1. If block 1 is read instead, then the older chunk 0 is found because pcu(3).bitmap[1] is 0 while pcu(0).bitmap[1] is 1.

With respect to the deletion operation, to delete sequentially aligned RV, those chunks shared by other SNAP's need to be kept in the chunk table and the search table, but with updated generation value.

However, those chunks only owned by the will-be-deleted sequentially aligned RV cannot be recycled as free chunks because they may contain the valid blocks needed by RV1 or other SNAP's. In this example, pcu(0) and pcu(3) cannot simply be recycled as free chunks because they contain the blocks needed by pcu(4).

In following the previous example, it can be assumed that the user wants to delete SNAP 2. It was found that pcu(3) has the generation exactly equals to 2 and pcu(4) is the previous chunk of pcu(3) in search list 0, but pcu(4).bitmap[0.3] is 0100 not 1111 and pcu(3) cannot be recycled, so mark pcu(3).generation=MAX (pcu(4).generation is MAX). The chunk table and the search table are updated as follows:

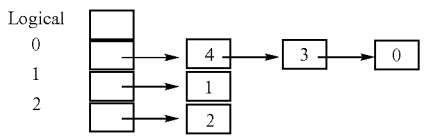

The blocks in pcu(3) to pcu(4) cannot be moved because this scheme will require excessive amount of time in moving data, thus the sequentially aligned RV deletion will easily time out. In this way, the address mapping scheme can still work. After SNAP 2 is deleted, if chunk 0 of RV1, block 1 is read, chunk 4, block 1 as before can be read as before. But if chunk 0 of RV1, block 0 is read, pcu(4).bitmap[0] is 0 can be found. Then, it can be mapped to pcu(3), block 0. Therefore, the READ process can still work well.

Assume that the user wants to delete SNAP 1. pcu(0) is found to have the generation exactly equaling to 1 and both pcu(4) and pcu(3) whose generation is MAX are the previous chunk of pcu(0) in search list 0. But pcu(4).bitmap[0 . . . 3] |pcu(3).bitmap[0 . . . 3]=0100|1010=1110 is not equal to 1111, thus pcu(3) cannot be recycled, so mark pcu(3) .generation=MAX. Now, chunk table and search table can be the following, respectively:

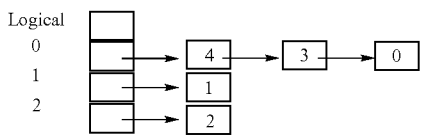

The invalid bits need to be reset because the search table will be rebuilt during deactivation and activation. The generation field of chunk table is used to keep the order of node in the search table, but now a logical chunk can have several physical chunks whose generation is the same. In the last example, the logical chunk 0 has 3 relevant physical chunks, 0, 3, 4. their order now cannot be assured when rebuilding the search table. And chunk 0 cannot be put in front of chunk 3 and 4 because its bitmap is 1111. Thus, the bitmap should be updated. If a block is shared, its relevant bit will remain 1; while if a block is invalid, it's relevant bit should be mark 0.

Now, it is known that chunk 3 and chunk 4 have a combined bitmap 1110. The first 3 blocks should be invalid, while the last block is still shared. Therefore, in the last example, the final result should be:

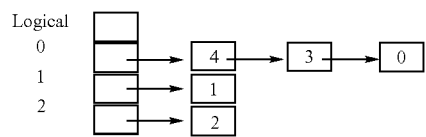

Thus, the order of chunk 0, 3, 4 doesn't matter now. If chunk 0 of VD1, block 3 is read, chunk 0, block 3 can be found.

In a more complicated situation, when a logical chunk has two or more relevant physical chunks. Still following the above example, assume a command is received to write chunk 0 block 3. The physical chunk 4 can be found first, and the data can be written to chunk 4, block 3. Mark pcu(4).bitmap [3]=1. Then chunk 0, block 3 is invalid. Mark pcu(0).bitmap [3]=0. Then CT(0).bitmap[0.3] is 0000, that means chunk 0 can be recycled as free chunk now. Mark pcu(0).generation=0, remove the pcu(0) from search list 0, and put it into free list. The chunk table and search table will become:

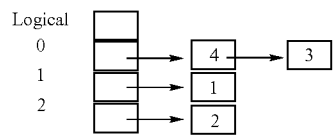

With respect to RV extension, both the RV size and reserved size will be extended. Assume that RV size is extended with 2 chunks and the reserved space with 2 chunks. The chunk table and search table will be:

| Physical | Logical | Generation | bitmap |
|---|---|---|---|
| 0 | 3 | MAX | 1111 |
| 1 | 1 | MAX | 1111 |
| 2 | 2 | MAX | 1111 |
| 3 | 0 | MAX | 1010 |
| 4 | 0 | MAX | 0101 |
| 5 | 4 | MAX | 1111 |
| 6 | | 0 | |
| 7 | | 0 | |
| 8 | | 0 | |

Logical
0 →
1 → 4 → 3
2 → 1
3 → 2
4 → 0
  → 5

The extended RV chunk will use the chunk from the free list.

In yet another example, assume that RV1 has 4 SNAP's and the SNAP's have the generation 1, 2, 3, 4. The following table is their chunk table and search table:

| Physical | Logical | Generation | bitmap |
|---|---|---|---|
| 0 | 0 | 1 | 1111 |
| 1 | 1 | MAX | 1111 |
| 2 | 2 | MAX | 1111 |
| 3 | 0 | 3 | 1010 |
| 4 | 0 | MAX | 0100 |

Logical
0 → 4 → 3 → 0
1 → 1
2 → 2

Consider that SNAP 3 is deleted. Chunk 3 belongs to SNAP 3 but it is also shared by SNAP 2. So set pcu(3).generation=2. If SNAP 2 is deleted rather than 3, no chunk has the generation 2. So the chunk table need not to be changed. If SNAP 1 is deleted, chunk 1 is owned only by SNAP 1 but it also shared data with chunk 3 in block 1 and 3, so set pcu(1).generation=3 and set pcu(1).bitmap[0 . . . 3]=0101.

Consider that RV1 is rolling back to SNAP 3, Chunk 3 has the destination generation 3, so the chunk 3 can be recycled and set pcu(3).generation=MAX. If RV1 is rolling back to SNAP 2 rather than 3, chunk 3 which is sharing data with SNAP 2, so the change is the same as before. If RV1 is rolling back to SNAP 1, chunk 0 has the destination generation 1, so chunk 0 can be recycled and set pcu(0).generation=MAX.

The search table is used only when a RV device is running. It's not necessary to write the search table into disk. Each search list can be rebuilt when RV devices are activated. There are 2 parts in a search table, search list head array and the chunk node. The chunk node is the pcu. The search list head can be organized in an array, the head can be found by logical chunk number immediately. Contiguous memory space cannot be allocated for it because the array in RV extension may be extended. Therefore, the search list head is allocated in pages. New pages are allocated when it is extended. The entry in the search list head array is a chunk number whose size is 4 bytes. It is the physical chunk number of the first pcu in the search list. Thus, to get the head pcu of a search list with logical chunk number, first the page number is calculated, and second the offset in pages is calculated.

When a file is deleted, the chunks occupied by it can be reclaimed. Since the storage is only a volume device and has no knowledge of the file systems, it doesn't know which chunks can be reclaimed at the time.

After a file is deleted, the chunks used will be written again later. Since new data is written to a logical chunk and with ROW, a new physical chunk can be chosen to be used. Only the chunk table needs to be modified to map the chunk to same logical chunk. After the new physical chunk is filled with data, the original physical chunk can be marked as free and added to free list; thus reclaimed.

Figure 4:
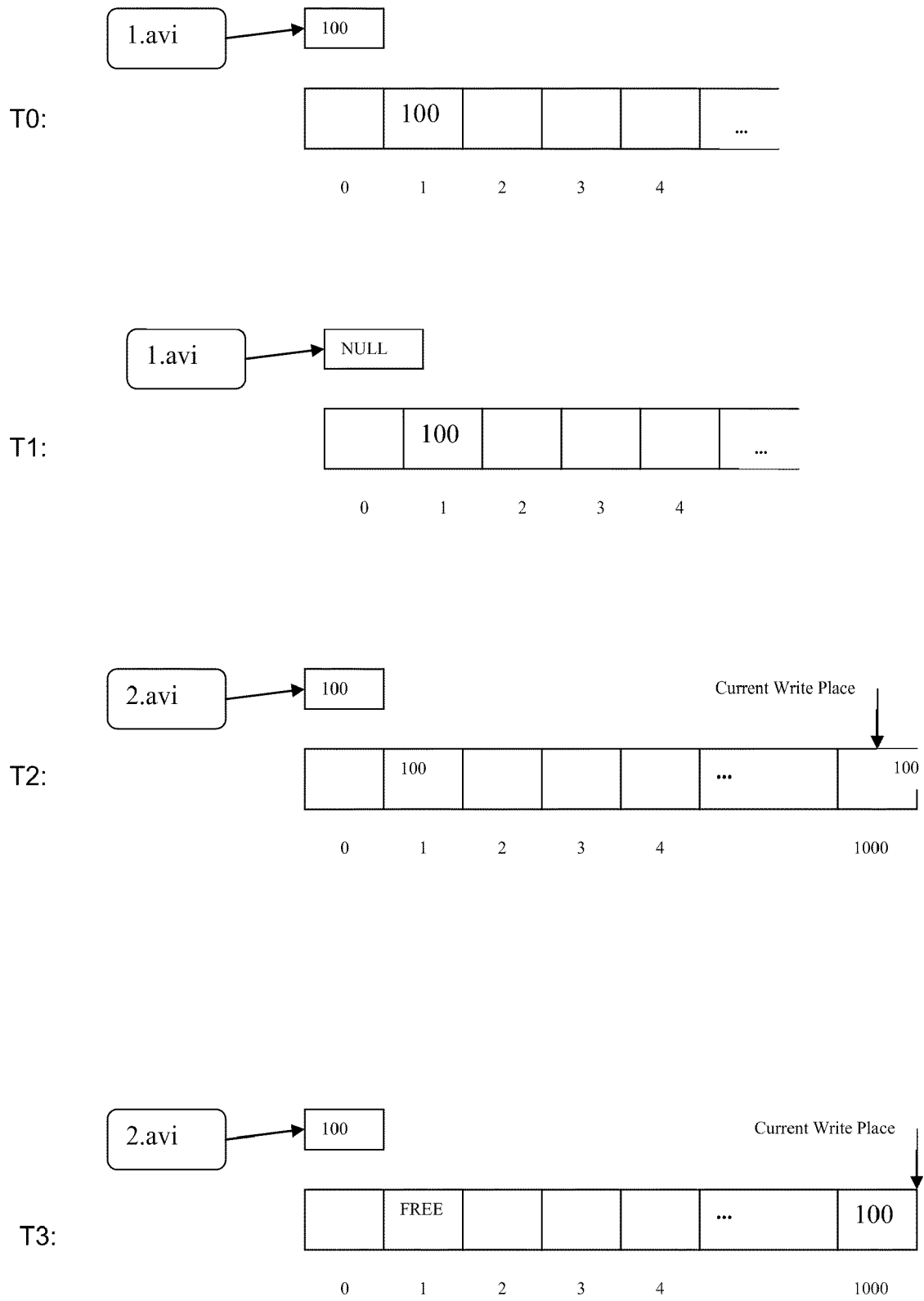
FIG. 4 illustrates the process of reclaiming a free chunk.

FIG. 4 illustrates the process of reclaiming a free chunk. At a time T0, File 1.avi uses logical chunk 100. After ROW calculation, it uses physical chunk 1. The metadata of FS record the logical location of 1.avi. For simplicity, the logical chunk number is recorded in the metadata.

At a time T1, File 1.avi is deleted. Only the metadata of 1.avi is modified. The FS knows logical chunk 100 is free now, but the storage system doesn't, because the FS exists in the host, not in the target, so the chunk won't be freed.

At a time T2, another file, 2.avi, can use logical chunk 100 because the FS knows the logical chunk 100 is free. To improve performance, the data is not written to physical chunk 1. Assuming the physical chunk 999, the data is written to physical chunk 1000 (if it's free), and mapped to logical chunk 100. Before physical chunk 1000 is being written completely, there are two physical chunks (1 and 1000) mapped to logical chunk 100. The bitmap can be used to identify the valid data of the chunk.

At a time T3, when physical chunk 1000 is filled with data, that data in physical chunk 1 are not valid any more, so the chunk table is modified and the chunk is reclaimed.

With respect to reserved space, suppose there are only 10 chunks in a disk. Here is a write sequence with logical chunk numbers:

3, 5, 2, 1, 7, 6, 4, 9, 8, 0, 6, 7, 3, 7, 2, 1, 8, 7, 5, 1, . . .

Figure 5:
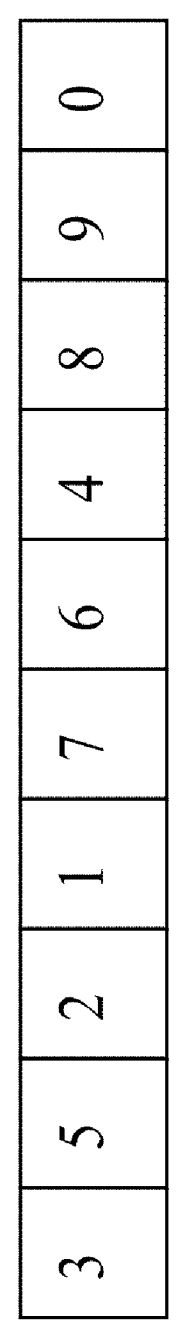

The write requests are random. However, with ROW, the write operation will be very sequential for the first ten write requests. FIG. 5 illustrates the chunk table for the beginning of these requests.

Figure 6:
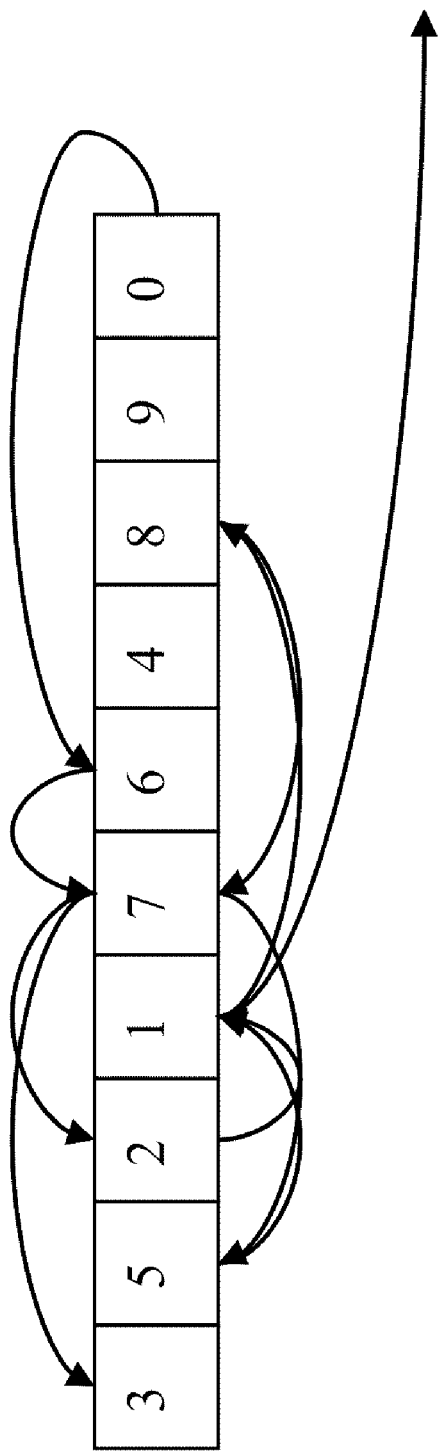

Now, the logical chunk 6 is written again. There are no free chunks to use. There is no other choice but to overwrite logical chunk 6. The disk head will be moved to physical chunk 5, and overwrite the original data of logical chunk 6. The same problem occurs when writing the following chunks. As illustrated in FIG. 6, the write operations will be random. Random physical chunk write is not an objective, so a way must be found to resolve this problem.

When free chunks are available all the time, ROW can be done anytime. So some disk space can be reserved to fulfill this requirement. If the disk is full for the host computer, there are still some free chunks in the disk that can be used. Since the hard disk is very cheap today, the user can endure the cost of a little disk space waste.

Suppose there are 10 logical chunks in the disk, but there are 12 physical chunks to be used and 2 chunks are reserved. FIG. 7 illustrates the chunk table if logical chunk 6 is written again.

Then we write logical chunk 7 again (illustrated in FIG. 8). Now physical chunks 4 and 5 are freed. Then, FIG. 9 illustrates the logical chunks.

When the disk head moves to the end of the disk, it will return to chunk 0. After that, the consecutive chunks can be found to be written. The performance may drop, but the disk head is always moving in one direction (except when it moves to the end of the disk), so the overall performance is better than random write.

If the percentage of the reserved space is large, it's easy to find more free chunks to use. The performance is better.

The ROW implementation of snapshot uses space below the original VD or RV. In this case, the sequentially aligned RV is located at the end of original RV. This is extra space to execute the ROW, and at the same time to allow the system to identify chunks that can be reclaimed.

If the reserved space is 100%, the performance is very good from test results. For the system optimization purpose and tradeoff, the space needed can be adjusted. For snapshots, 30% is typically reserved.

The sequentially aligned RV (or ROW) can be triggered by the fragmentation amount. This is similar to taking a snapshot. Once the ROW is triggered, small data fragments with far apart addresses will be stored consecutively, and the performance will be improved. Since the ROW uses additional space, the system can reclaim the space used earlier during the process. This addresses the fragmentation issue.

If a new chunk is written, an unused chunk should be taken from the free list. In order to make the disk head moves in one direction, the free chunks should be sorted according to the physical chunk number. Without sorting, the write requests will be random again.

Right after a VD is created, all the chunks are free. It's easy to put them into a list in order. But things are changed when a used free chunk is freed. In a normal system mode, the freed chunk is added to the tail of the free list. Then the list becomes unsorted and the performance will drop evidently later.

A VD may be very large and there may be so many chunks. The free list can be very long, so a sorting algorithm, which will be fast and occupies less memory can be employed.

A hash table is a simple way to make free chunks sorted. Only pointers may be stored in the table. If a suitable hash spacing number is chosen, the table size can be very small. For example, if the spacing number is assigned 16 (it means that each hash entry can be linked with 16 physical chunks), the table size for 1 TB VD (including reserved space, with 1 MB Chunk size) is:

1024*1024*8/16=512 KB

Compared to the chunk table size (1024*1024*64=64 MB), the hash table size is very small. If the spacing number is bigger, the hash table size can be smaller. In some cases, the search process may be slow.

Figure 10:
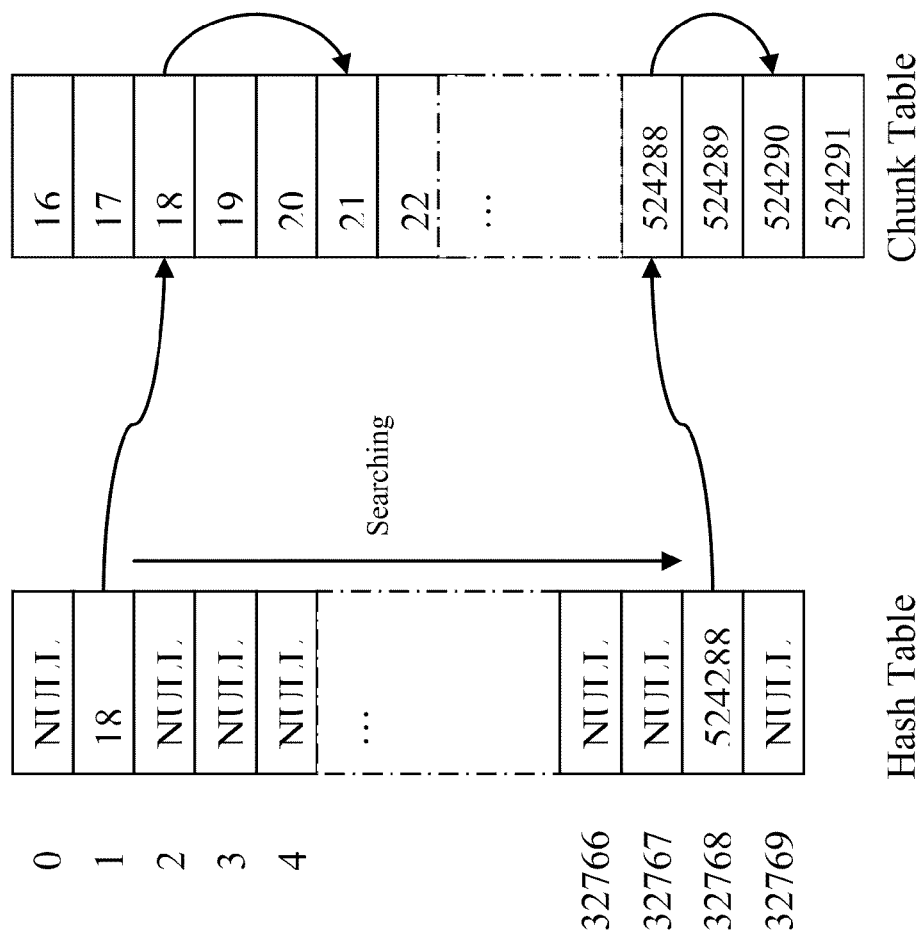
FIG. 10 illustrates one-level hash tables, in which the hash spacing number is 16.

FIG. 10 illustrates one-level hash tables, in which the hash spacing number is 16. When entry 1 of the hash table is retrieved, the physical chunk entry 18 and 21 in the chunk table can be quickly found. If the next free chunk is requested, the hash table can be searched for a long time. After thousands of comparisons, in entry 32768, the free physical chunk with the number 524288 is found.

Figure 11:
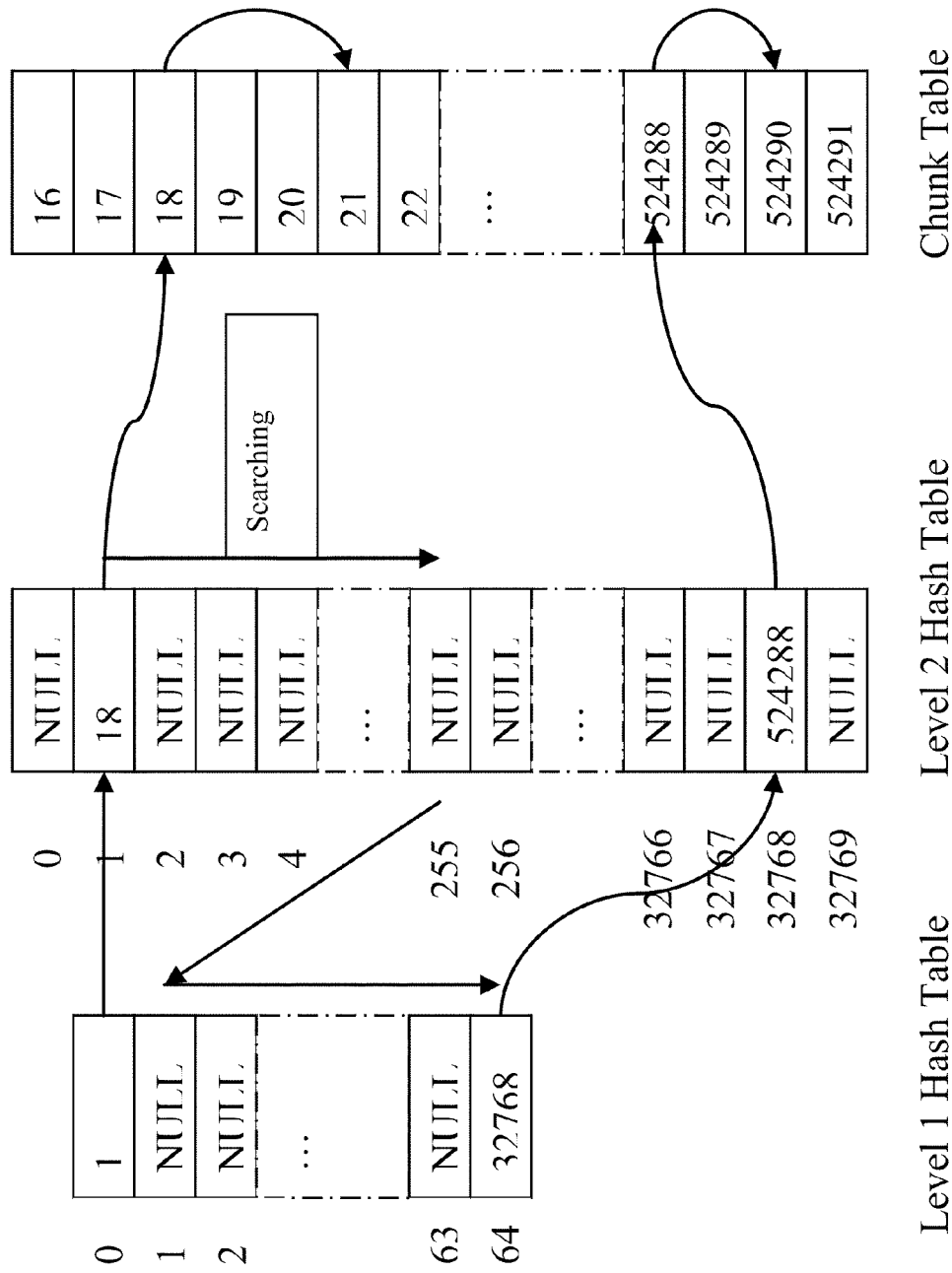
FIG. 11 illustrates two-level hash tables, in which the spacing number of Level 1 hash table is 256 and the spacing number of Level 2 hash table is 16.

Two-level hash tables can be used to reduce the search time. FIG. 11 illustrates two-level hash tables, in which the spacing number of Level 1 hash table is 256 and the spacing number of Level 2 hash table is 16. After receiving physical chunk 21, the next free chunk is requested. Level 2 hash table can be searched, until entry 255 is found. Then Level 1 hash table is searched. In entry 64 of Level 1 hash table, a non NULL pointer pointing entry 32768 of Level 2 hash table is found. From it, the free chunk with the number 524288 is retrieved. The number of search times is far less than the times when using one level hash table.

In most cases, a free chunk can be found only in Level 2 hash table. In the worst case for 16 TB VD with 1 MB chunk, it can be searched for several thousand of times in the two-level hash table. But when searching, only simple comparisons are performed, so the searching speed is relatively fast. Typically, it's faster than the speed of copying data for a chunk.

Though the memory usage of Level 2 hash table is small, it still occupies several MB memory space for a huge capacity VD. Sometimes consecutive pages for such a space cannot be gotten. Sometimes the VD will be extended, and the table won't be contiguous again. So here memory is allocated for Level 2 hash table page by page. And the page pointers can be stored in another table. Because the size of Level 1 hash table is small, the memory can be allocated for it directly.

Figure 12:
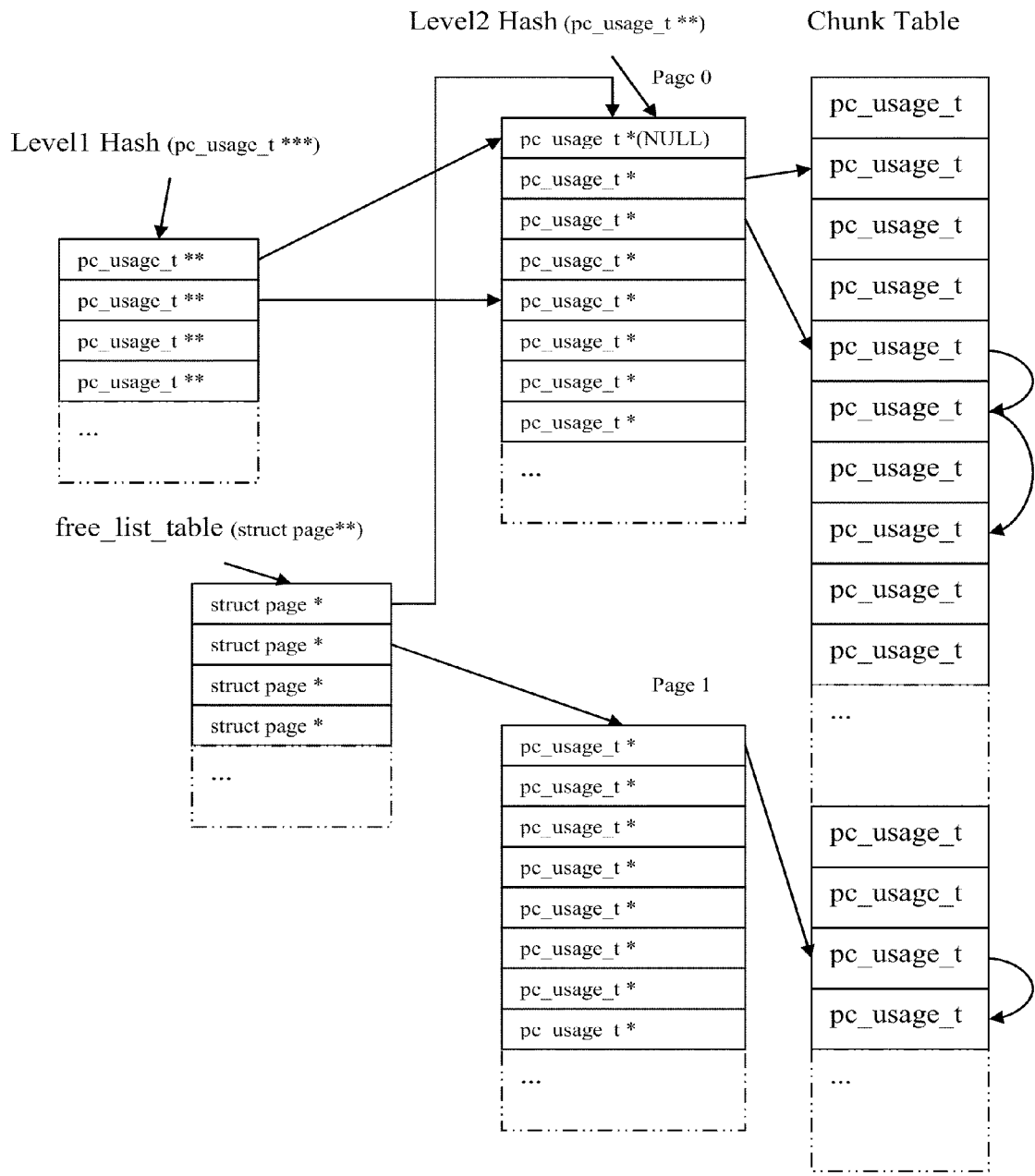
FIG. 12 illustrates the data structure for the two-level hash table.

FIG. 12 illustrates the data structure for the two-level hash table in detail. For simplicity, the spacing numbers of the two levels are both 4. The entry type of the chunk table is pc_usage_t.

If the chunk size is small (e.g. 1 MB), the random writing speed is fast and the RC cache is small, but the size of chunk table is large. For example, 16 TB DG with 1 MB chunk size needs 1 GB chunk table. On the contrary, if the chunk size is large (e.g. 16 MB), the random writing speed may be slow and the RC cache is large, but the size of chunk memory is small. For example, 16 TB DG with 16 MB chunk size only needs 64 MB chunk table.

The relationship between the chunk size, the chunk table size and the disk capacity supported can be found in the following table.

| Chunk size | Total capacity w. CK table of 256 MB | Total capacity w. CK table of 512 MB | Total capacity w. CK table of 1024 MB | Total capacity w. CK table of 1536 MB | Total capacity w. CK table of 2048 MB | Total capacity w. CK table of 2560 MB | Total capacity w. CK table of 3072 MB |
|---|---|---|---|---|---|---|---|
| 1 MB | 4TB | 8TB | 16TB | 24TB | 32TB | 40TB | 48TB |
| 2 MB | 8TB | 16TB | 32TB | 48TB | 64TB | 80TB | 96TB |
| 4 MB | 16TB | 32TB | 64TB | 96TB | 128TB | 160TB | 192TB |
| 8 MB | 32TB | 64TB | 128TB | 192TB | 256TB | 320TB | 384TB |
| 16 MB | 64TB | 128TB | 256TB | 384TB | 512TB | 640TB | 768TB |

If the Chunk Table is used to cover the whole RV and uses small Chunk size, the table size can be big. There are optimizations to use ROW ONLY for certain situations. In this way, the chunk table size can be reduced.

One situation can be the time that we see extensive fragments in the systems. Using VAN technologies, the severity of fragments to trigger the ROW can be easily identified.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A method for storing data, comprising the steps of:
defining one or more intervals for one or more virtual disks, wherein each of the intervals has data;
receiving a storage command in a cache, wherein said command having a logical address and a data block;
determining a respective interval for the data block corresponding to the logical address of the data block;
determining whether the data of the respective interval is to be written to a corresponding storage unit; and
receiving a next storage command,
wherein if an interval is not filled after receiving several storage commands, the data of the storage commands are determined as metadata.

2. The method of claim 1 wherein in the second determining step, if the size of the data block of the respective interval exceeds a predefined threshold, write the data of the respective interval to the storage unit.

3. The method of claim 1 wherein in the second determining step, if the size of the data block of the respective interval does not reach a predefined threshold, hold the data in the respective interval.

4. The method of claim 1 wherein in the second determining step, if the respective interval is allocated for a predetermined amount of time, the data of the respective interval is written to the storage unit.

5. The method of claim 1 wherein the metadata is held in the respective intervals.

6. The method of claim 1 wherein an interval corresponds to a plurality of sectors.

* * * * *